United States Patent
Weidinger et al.

(10) Patent No.: US 10,227,466 B2
(45) Date of Patent: Mar. 12, 2019

(54) MATERIAL FOR FLEXIBLE THERMAL AND ACOUSTIC INSULATION

(75) Inventors: Jürgen Weidinger, Muenster (DE); Christoph Zauner, Muenster (DE)

(73) Assignee: ARMACELL ENTERPRISE GMBH & CO. KG, Schoenefeld OT Waltersdorf (DE)

(*) Notice: Subject to any disclaimer, the term of this patent is extended or adjusted under 35 U.S.C. 154(b) by 733 days.

(21) Appl. No.: 13/303,593

(22) Filed: Nov. 23, 2011

(65) Prior Publication Data
US 2012/0135221 A1 May 31, 2012

(30) Foreign Application Priority Data
Nov. 30, 2010 (EP) .................................... 10193075

(51) Int. Cl.
*C08J 9/00* (2006.01)
*C08L 9/06* (2006.01)
*C08L 27/06* (2006.01)

(52) U.S. Cl.
CPC ............ *C08J 9/0061* (2013.01); *C08J 9/0019* (2013.01); *C08L 9/06* (2013.01); *C08L 27/06* (2013.01); *C08J 2300/26* (2013.01); *C08J 2309/08* (2013.01); *C08J 2423/00* (2013.01); *C08J 2427/00* (2013.01); *Y10T 156/1002* (2015.01); *Y10T 428/249953* (2015.04)

(58) Field of Classification Search
None
See application file for complete search history.

(56) References Cited

U.S. PATENT DOCUMENTS

| 2,849,028 | A | * | 8/1958 | Clark et al. ................... 428/36.5 |
| 3,616,020 | A | | 10/1971 | Whelan et al. |
| 4,500,591 | A | | 2/1985 | Peltier et al. |
| 5,795,634 | A | * | 8/1998 | Fukui ........................... 428/36.1 |
| 2003/0109621 | A1 | * | 6/2003 | Miura et al. .................. 524/464 |
| 2004/0092666 | A1 | * | 5/2004 | Kitano .................. C08F 297/04 525/192 |
| 2004/0126562 | A1 | * | 7/2004 | Manzo et al. ............. 428/313.5 |
| 2006/0142455 | A1 | * | 6/2006 | Agarwal ................ B82Y 30/00 524/423 |
| 2007/0012509 | A1 | * | 1/2007 | Shimada ................. B60R 13/08 181/256 |

(Continued)

FOREIGN PATENT DOCUMENTS

| DE | 1961037 A1 | 7/1970 |
| DE | 210546 A3 | 6/1984 |

(Continued)

OTHER PUBLICATIONS

Harper (ed): Handbook of Plastics, Elastomers, and Composites, pp. 224-225, 2002.

(Continued)

*Primary Examiner* — Chinessa T. Golden
(74) *Attorney, Agent, or Firm* — Rothwell, Figg, Ernst & Manbeck, P.C.

(57) ABSTRACT

The present invention relates to a material for thermal and/or acoustic insulation comprising an expanded elastomeric and/or thermoplastic elastomer blend based on styrenic organic polymer and chlorinated organic polymer, the process for the manufacturing of such material, and the use of such material.

37 Claims, 3 Drawing Sheets

(56) References Cited

U.S. PATENT DOCUMENTS

2009/0169860 A1* 7/2009 Katsunori et al. ......... 428/314.8
2010/0071289 A1 3/2010 Princell et al.

FOREIGN PATENT DOCUMENTS

| DE | 4326367 A1 | 2/1995 |
| EP | 1970403 A1 | 9/2008 |
| GB | 788344 | 12/1957 |
| IT | 1203818 B | 2/1989 |
| JP | 57064537 A | 4/1982 |
| JP | 09123688 | 5/1997 |
| KR | 100316366 B1 | 11/2001 |
| KR | 20030026671 A | 4/2003 |

OTHER PUBLICATIONS

Zhu et al., "Poly(vinly chloride)/Styrene-Butadiene Rubber Blends Prepared by Dynamic Vulcanization with Nitrile Rubber as the Compatibilizer" Journal of Applied Polymer Science, 58:621-631, 1995.

* cited by examiner a)

b)

MATERIAL FOR FLEXIBLE THERMAL AND ACOUSTIC INSULATION

CROSS REFERENCE TO RELATED APPLICATIONS

This application claims priority under 35 U.S.C. § 119 to European Patent Application No. 10193075.8 filed Nov. 30, 2010, which is incorporated herein in its entirety.

The present invention relates to a material for thermal and/or acoustic insulation comprising an expanded elastomeric and/or thermoplastic elastomer blend based on styrenic organic polymer and chlorinated organic polymer, the process for the manufacturing of such material, and the use of such material.

FEFs (flexible elastomeric foams) are flexible insulation materials. Such materials are almost exclusively based on a narrow selection of polymer bases, i.e. nitrile butadiene elastomer (NBR, e.g. in brands NH/Armaflex®, AF/Armaflex®, K-Flex® ST, Kaiflex® KK) and ethylene diene (EPDM, e.g. HT/Armaflex®, Aeroflex®). The latter polymer base is mainly used for higher temperature shielding, such as in industrial and solar insulation, whereas NBR is the most widespread polymer base for standard FEFs, such as in heating and plumbing and ventilation and cooling applications.

There are manifold reasons for this dominating: NBR is said to be tolerant in blending it with other polymers and with fillers, it shows good general mechanical properties and good physical and chemical stability, and it is said to be most suitable for creating a good balance in crosslinking and expansion. One major reason, however, why NBR has been the polymer of choice for decades is the fact that it is compatible with PVC, which itself is said to have positive effect on the foaming process by melting and thus absorbing excess enthalpy (e.g. created by exothermic foaming/crosslinking) and which of course is of very economic cost. Additionally, PVC will provide better touch and feel and improved handling properties to the expanded and crosslinked FEF insulation material. When the first FEF had been introduced in the 1950s it had been tried to use and claim other than NBR/PVC blends. The respective patent (GB 788344) mentions butadiene styrene acrylonitrile copolymer as one alternative, however, the described compositions and examples clearly indicate that NBR/PVC or NBR/PS is preferred, and consequently, no further efforts on other elastomer/PVC blends had been undertaken as the a.m. FEF history has shown.

However, NBR is showing some drawbacks when it comes to comparing it with other elastomeric polymers: it is a specialty synthetic rubber mainly used in the automotive sector due to its oil resistance and therefore it is both not very economic in price and shows restricted availability when it comes to grades, suppliers and volume. As a consequence there is less literature and supporting chemicals known or available than for more widespread rubber polymers. And last but not least NBR is forming hydrogen cyanide in case of burn.

An important disadvantage of using EPDM is the worse fire performance of the commercial available insulation products, e.g. HT/Armaflex® (EN 13823: D s3 d0; DIN 4102-1: B2) or Kaiflex® EPDMplus (EN 13823: E; DIN 4102-1: B2). This is not only caused by the rubber itself, but even by the limited possibility of using e.g. halogenated or phosphorus containing flame retardants/plasticizers, due to their incompatibility, caused by the different polarities of EPDM and flame retardants/flame retardant plasticizers. Additionally EPDM is forming exceptionally high quantities of CO in case of burn.

Moreover, the insulation properties of commercially available EPDM based insulation foams are worse (according to DIN EN ISO 8487 at 0° C.: HT/Armaflex®: 0.038 W/mK; Kaiflex® EPDMplus: 0.038 W/mK; for NBR/PVC products see Table 5). Even the water vapour properties are on a lower level (according to DIN EN ISO 12572: HT/Armaflex®: µ≥4.000; Kaiflex® EPDMplus: µ≥4.500, for NBR/PVC products see Table 5). Additionally, EPDM foams tend to shrink to a greater degree.

It would therefore be favourable to use well known and examined rubber polymers, such as styrene butadiene rubber (SBR) for FEFs, however, it is said that the SBR's significantly lower polarity and the difference in polymer morphology and surface energy vs. NBR will hamper mixing it with or into PVC (see e.g. Zhu et. al. in: Journal of Applied Polymer Science vol. 58/3, 1995, pp 621-631: PVC and SBR need NBR and other chemicals as compatibilizer; similar statements can be found at Harper (ed): Handbook of Plastics, Elastomers, and Composites, 2002, pp 224-225) Some patents confirm this in practice by consequently using NBR to blend SBR into PVC. With materials having similar polarity/morphology like NBR also similar emulsification effects can be expected: DE 1961037 uses pitch-like material instead of NBR to achieve an SBR/PVC mixture, however, with low SBR content in relation to pitch. Eventually, DD 210546 claims that mixing SBR and PVC will create major difficulties and proposes to overcome this by copolymerisation.

This said incompatibility would be one major obstacle to fulfil the market requirements for FEFs together with said less expandability and less "nerve" (i.e. compression deflection/rebound resilience combined with modulus). Indeed, SBR has found very limited use in combination with PVC. U.S. Pat. No. 4,500,591 describes PVC/SBR latex on a foam for adhesion purposes; generally, latex is at least an appropriate method to compatibilize SBR and vinyl chloride polymers. Similarly, the emulsion of SBR like polymers into a vinyl chloride homo or copolymer plastisol or organosol is examined; JP 9123688 discloses an eraser made of PVC containing e.g. SBR powder.

The explicit combination of SBR and PVC in expanded materials has only been described for some special applications: e.g. KR 20030026671 claims foam-type mastic for sealing which contains SBR and PVC among other chemicals (e.g. resins, plasticizers; all acting obviously as emulsifiers), DE 4326367 discloses a rigid PVC for moulded foam parts which is modified with rubbers, among them SBR, with stabilisers.

SBR in combination with CPE, which is very similar to PVC, of course, has found even less application in foams: some patents describe thermoplastic foams (e.g. polystyrene or polyethylene foam) where CPE and SBR can be used as additives.

For insulation purposes SBR and PVC have not been used in one compound, but only in combinations, as in IT 1203818, where SBR and PVC form parts of the composition of the self-adhesive layer of an insulation product. Even the bare use of SBR for insulation materials is very limited: KR 100316366 mentions SBR as one facultative out of numerous ingredients of an ethylene/EVA based copolymer insulation foam.

A major object of the present invention thus is to provide a versatile, preferably flame retardant FEF insulation material that is reliable, economic and easy to apply and will fulfil modern regulations and approvals in the respective application fields.

Surprisingly, it is found that such a versatile FEF material not showing the above mentioned disadvantages can be achieved by expanding an elastomeric or thermoplastic elastomer blend comprising styrene substituted organic polymer and chlorinated organic polymer which are mixed by the aid of physical dispersion through emulsifying additives and/or of mechanical dispersion through appropriately loading the blend with fillers, and optional further additivation.

In the drawings, which form a part of this specification,

Figure 1:
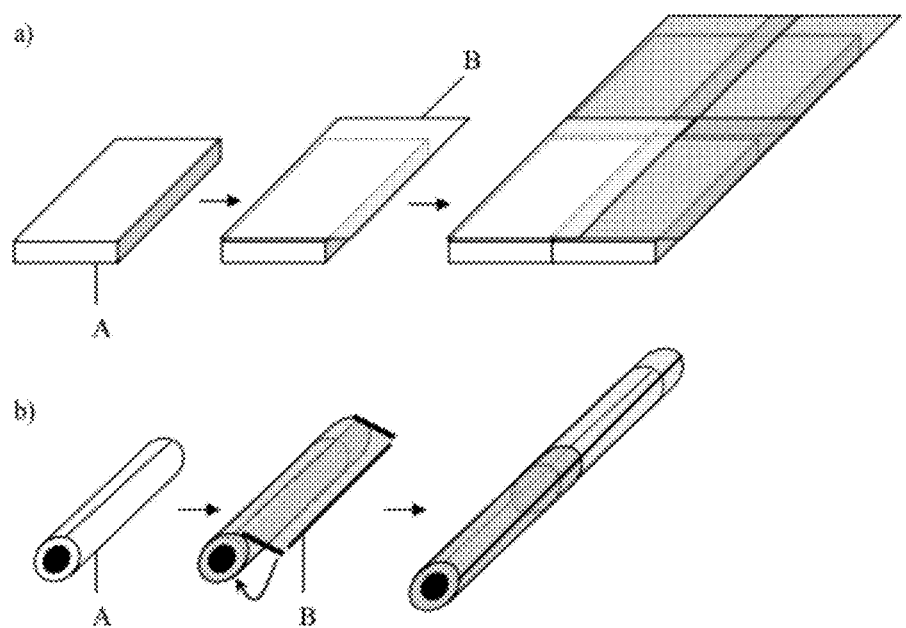
FIG. 1 is a schematic drawing of possible lap seals for planar (FIG. 1a)) or tubular (FIG. 1b)) configurations of the claimed material to form tightly sealed insulation installations.
Figure 2:
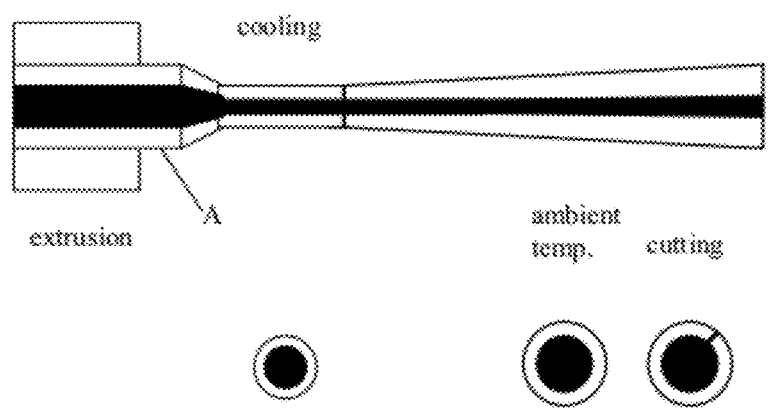
FIG. 2 is a schematic drawing of a possible way of manufacturing of the claimed material as a mono or multi-layer product without need of waiting for degassing/shrinkage.
Figure 2:
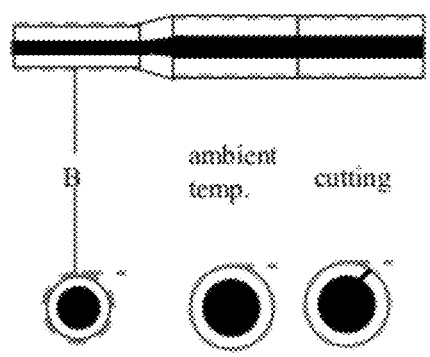
Figure 3:
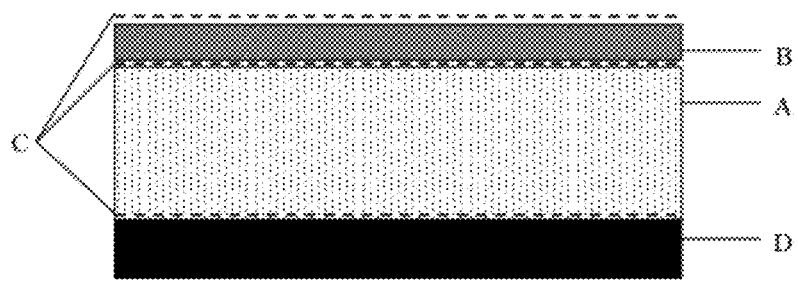
FIG. 3 is a schematic drawing of possible composites of the claimed material.

The claimed material comprises at least one layer (A), see FIG. 1-3 of expanded elastomer or thermoplastic elastomer blend which itself comprises a styrene substituted organic polymer, preferably styrene butadiene polymer. The styrene substituted polymer shows a styrene content of at least 10%, preferably at least 17%, especially preferred 20% and higher (bound styrene according to ASTM D5775). The styrene substituted organic polymer is present in the formulation in at least 30 phr (parts per hundred rubber, means, it represents at least 30 percent of the elastomeric content of the claimed material), preferably at least 50 phr, especially preferred at least 70 phr.

The elastomer or thermoplastic elastomer blend furthermore comprises at least 10 phr, preferably at least 30 phr, especially preferred at least 50 phr—related to the styrene substituted polymer—of a chlorinated organic polymer of thermoplastic or thermoplastic elastomer nature, preferably polyvinyl chloride (PVC), chlorinated polyethylene (CPE, CM), chlorosulfonated Polyethylene (CSM), or any mixture thereof. Additionally the elastomer or thermoplastic elastomer blend comprises at least 30 phr, preferably 50 phr, especially 70 phr of halogenated paraffin, halogenated fatty acid substituted glycerine, or any combination thereof—representing an oil and/or fat and/or wax—, preferably chloroparaffin and/or chlorinated fatty acid substituted glycerines, especially preferred long-chain chlorinated paraffin (C>17) and/or glycerines substituted with fatty acids with at least respective C>8. The degree of chlorination of the chlorinated paraffin and/or the glycerines substituted with fatty acids is least 15 percent, preferably at least 20 percent, especially preferred at least 30 percent.

The elastomer or thermoplastic elastomer blend may also comprise at least 30 phr, preferably at least 100 phr, especially preferred more than 200 phr of inorganic filler, preferably of metal and/or half metal chalkogen (i.e. compound of oxygen, sulphur) nature. The inorganic filler may be an aluminium compound, such as aluminium silicates, oxides, hydroxides etc., e.g. ATH (aluminium trihydroxyde), and/or a silicon based compound, such as silicates, quartz, zeolites etc., or mineral based accordingly, e.g. on gypsum, clay, perlite, vermiculite, chalk, slate, graphite, talc/mica etc., or any mixtures thereof.

The a.m. ingredients show easy mixing and good dispersion in a wide range of dosage (see Table 2/3).

The elastomer or thermoplastic elastomer blend furthermore may comprise at least one crosslinking system such as peroxides, hydrosilylation agents, radiation activators (for radiation or UV curing), sulphur compounds, bisphenolics, metal oxides etc.

The expanded elastomer or thermoplastic elastomer blend furthermore may comprise at least one expansion agent chosen from the classes of chemical expansion agents (e.g. releasing carbon dioxide, nitrogen, oxygen or water) and/or physical expansion agents (e.g. solvents, CO2, N2, other gases). Preferred are chemical expansion agents, especially preferred is azodicarbonamide.

The elastomer or thermoplastic elastomer blend is expanded to a mainly closed cell foam with a closed cell content of at least 80% and to a density of less than 100 kg/m3, preferably less than 65 kg/m3, especially preferred less than 50 kg/m3 according to ISO 845 to lower the thermal conductivity to less than 0.075 W/mK at 0° C., preferably less than 0.040 W/mK at 0° C., especially preferably less than 0.035 W/mK at 0° C. according to EN 12667.

The elastomer or thermoplastic elastomer blend furthermore may comprise a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivates), complex silicates (e.g. perlite, vermiculite), and combinations thereof.

The elastomer or thermoplastic elastomer blend furthermore may comprise all kinds of other fillers or additives, such as other elastomers (e.g. based on polymers of ACM/AEM, AU/EU, BR, BIIR, CIIR, CR, CSM/CSR, (G)(E)CO, EPM/EPDM, EVM, FKM/F(E)PM, GPO, IR, IIR, (V)MQ, (H)NBR, NR, T etc.), thermoplastic elastomers and/or thermoplastics and/or thermoset based polymer mixtures, fibres, flakes, or any combinations thereof, as virgin or as recycled material.

The elastomer or thermoplastic elastomer blend may comprise further additives such as flame retardants and synergists, biocides, plasticizers, stabilizers (e.g. versus UV, ozone, reversion etc.), colours etc., of any kind in any ratio, including additives for improving its manufacturing, application, aspect and performance properties, such as inhibitors, retarders, accelerators, etc.; and/or additives for adapting it to the applications' needs, such as char-forming and/or intumescent additives, like expanding graphite, to render the material self-intumescent in case of fire, e.g. for general protection purposes and/or to close and protect e.g. wall and bulkhead penetrations; and/or substances that will lead to a self-ceramifying effect to pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

The elastomer or thermoplastic elastomer blend of (A) is easily mixed to a stable compound despite of the fact that e.g. SBR and PVC are not compatible. This is achieved by two methods that can be applied separately or in parallel:

One way consists of mechanical dispersion of the two polymers into very small, mechanically miscible and stable particles, which is achieved by using at least 200 phr of inorganic filler with an appropriate hardness or stability of the filler particles. The suitability as dispersion aid therefore increases e.g. in the row carbon black/graphite<chalk<clay<ATH<silicates/quartz. Care has to be taken that the filler is not only enabling to disperse the polymers but is also then stabilizing the readily mixed compound to prevent demixing or formation of domains that would lead to processing problems as well as inhomogeneous expansion. It has been found during our works that fine powdered, relatively hard particles with medium polarity or of amphoteric nature will give best results, such as ATH, perlite, vermiculite or slate.

The elastomer or thermoplastic elastomer blend of (A) shows high tolerance in manufacturing (expansion, crosslinking), as the SBR base polymer 1) is known for accepting more variances in crosslinking conditions and 2) has experienced more scientific examinations and trials for crosslinking, blending, viscosity etc. than any other rubber polymer due to its widespread use.

The elastomer or thermoplastic elastomer blend of (A) shows very good flame retardant behaviour (see Table 3) due to the fact that 1) one of the most efficient dispersion agents is chloroparaffin, which itself is a flame retardant, that 2) due to at least equal or better interaction of classic flame retardants (antimony trioxide as synergist plus brominated organics) in the SBR matrix (see Table 4, example 6) and that 3) it is even possible to achieve a highly flame retardant level without brominated agents and without antimony and/or boron based compounds (see Table 4, examples 7-9 and 10).

Eventually, the elastomer or thermoplastic elastomer blend of (A) shows very good and appropriate insulation properties as desired for the intended applications (see Table 5). This is due to the a.m. tolerance in processing which allows expansion down to very low densities rendering the foam the better insulation material.

Layer (A) may show surface structures on one or both sides for sound and/or thermal decoupling purposes as well as for increasing the surface to adhere to for other layers to be applied. The structure can be of any shape, such as triangular, sinus shape, rectangular, trapezoidal, (semi)circular (semi)multi-edge (e.g. honeycomb) etc., and any combinations thereof. The structure of any shape can be applied in two dimensional manners, as e.g. ridges or tubes, or in three dimensional manners, as e.g. knobs, and any combinations thereof; the structure can be applied longitudinally or transversally or in any combinations thereof. This can be achieved by extrusion, embossing, deep-drawing, moulding, by applying the structure directly or by applying it onto a carrier (layer), in cold, warm or hot state, or in any combination of applicable methods.

The claimed material may furthermore comprise further layers (B), (C) see FIG. 3, which can be used as protective, decorative or functional (e.g. further insulation, mechanical support etc.) layer. Layers (B), (C) can be massive layers or can be expanded as described for (A). An expanded layer will support the thermal insulation properties, but in some cases lead to worse sound and flame barrier performance.

Layers (B), (C) may be brought into connection with each other and with (A) by use of adhesives, preferably flame retardant ones (such as e.g. PVC or CR based adhesives) or by directly melting the materials together, e.g. by heat or ultra high frequency welding. Surface structures for improving the optical aspect (e.g. for prevention of ripple formation in case of bending the material) and/or improving the flame retardant properties (dilution of fire energy by higher surface) may be applied onto (B), (C) by e.g. embossing them in.

Layer (B) preferably is applied to the substrate (A) in a way to provide one or more overlaps which can be sealed by adhesive and/or application of heat and/or UV to obtain applied composite layers with a complete built-on-top cladding (see FIG. 2 a). For tubular shape materials the overlap consequently can be applied to seal the longitudinal seam of the tube (if it is e.g. cut for better mounting) and/or the transversal seam (or butt joint) between two tubes (see FIG. 2 b). Layers (A) and (B) and/or (A) and (C) can be made as a direct composite, e.g. by co-extrusion or co-moulding, or can be produced separately and then brought together by gluing, UHF welding or melting one or both materials' surface, thus, in a more or less lamination process. This can be done in on- or off-line manner.

Due to the fact that freshly expanded polymer tends to shrink significantly (by loss of gas pressure and thermal contraction) on-line processes might implicate the danger of the final part to warp or crinkle. This can be overcome (see FIG. 2) by bringing the expanded and shaped, e.g. extruded, material (A) to a lower than the ambient (manufacturing) temperature, preferably down to less than 10° C., especially preferred down to less than −20° C.: the expanded material will contract and preferably shrink under its projected final diameter or thickness or size. Tension by gas is taken out of the material and letting it warm up again will lead to 1) less total shrinkage, means less danger of deformation and smoother surface and 2) stable properties in stock and during mounting (see FIG. 2a).

Alternatively, the material (A) can be considered as substrate for lamination and being treated the same way as mentioned above (see FIG. 2b): after being laminated with (B) the composite is allowed to warm up again. Cutting and other finishing manipulations may be applied afterwards. For planar material there will be less warping due to the fact that less shrinkage tension will occur in general. For tubular materials this will even be leading to the expanded inner layer (A) tightly pressing onto (B) providing excellent bonding and dimensional stability. By this method a fully continuous on-line process is feasible. The necessary cooling can happen by impulse cooling of surfaces in contact with the material, by running the material through cold atmosphere (e.g. chilled air, evaporating dry ice) or through cold liquids or solids (e.g. salt, powder).

Layers (C) can be applied between (A) and (B) and/or on top of (B) and/or at the inner side of (A) (see FIG. 3) that can contribute both to the mechanical strength necessary for the intended application as well as to the fire retardant properties. The compounds for (C) thus may be e.g. fibres, foils, papers, sheet etc. from polymers, metals, ceramics etc. in various forms, but also self-ceramifying, char-forming or intumescent compounds or compounds releasing flame-stopping or cooling or diluting substances, such as gas, vapour, liquids, halides etc., in case of fire. (C) may also have only decorative purpose. (C) may be bond to other layers of the material by adhesives or adhere by itself.

The claimed material furthermore may contain any further element (D) necessary for the intended application, such as wire inlays in case of cables or the like, massive parts such as wood, glass, metal or concrete structures for building purposes etc., or tubular parts, such as corrugated metal pipe for fluid transport etc., see FIG. 3. The elements (D) may be bond to other compounds of the material by adhesives, adhere by themselves or be enclosed mechanically.

A major advantage of the claimed material is its suitability for applications where low flame spread and/or low smoke generation are required (e.g. ASTM E-84, EN 13823/EN 13501-1, see Table 4), providing better economics and less critical substances.

It is a linked advantage of the claimed material that it may be flame retardant already without the use of critical chemicals that contain antimony, bromine or boron, as they are still standard in the industry.

It is a linked advantage of the claimed material that it is very versatile concerning the fire tests and shows constantly good performance under the different test conditions (see Table 4).

A further advantage of the claimed material linked to a.m. advantages is the fact that no additional measures have to be taken to render it fire retardant.

It is another important advantage of the claimed material that it provides very easy mounting when being applied with lap seals and that the lap seal leads to air or vapour tight sealing if installations.

It is another advantage of the claimed material that it provides equal insulation properties, like vapour barrier (vapour barrier properties are essential to prevent corrosion under insulation through condensation of humidity) and thermal conductivity or better economics.

It is another prominent advantage of the claimed material that it is easily processed on standard equipment and that it is very tolerant in manufacturing.

It is a prominent advantage of the claimed material that it can be produced in an economic way in a continuous process, e.g. by extrusion, extrusion and co-lamination or direct co-extrusion. It shows versatility in possibilities of manufacturing and application. It can be extruded, co-extruded, laminated, moulded, co-moulded, overmoulded, welded etc. directly as mono or multilayer system and thus it can be applied in unrestricted shaping onto various surfaces in automotive, transport, aeronautics, building and construction, furniture, machinery engineering and many other industries, even by a thermoforming or other shaping methods following the manufacturing process of the material.

It is a linked advantage of the claimed material that it can be transformed and given shape by standard methods being widespread in the industry and that it does not require specialized equipment.

It is a further advantage of the claimed material that the insulation effect can be enhanced by using hollow fibres and/or particles in layers (B) and/or (C).

Another advantage of the material is the fact that the layers (A)-(C) can contain scrapped or recycled material of the same or other kind not loosing its fire retardant properties significantly.

A further advantage of the claimed material is its suitability for thermal and sound/vibration insulation applications.

It is a further advantage of the claimed material that no heavy metals containing compounds, e.g. in form of stabilisers, are needed.

Another advantage of the claimed material is that no hydrogen cyanide is formed from acrylonitrile functions in case of burn if NBR is not part of the non-styrenic phr of elastomeric polymer.

Another advantage of the material is that no phthalate plasticizers are needed, which are suspected of being e.g. liver damaging, kidney damaging and/or carcinogenic.

A further advantage of the material is that no short- or medium-chain chloroparaffins (<C18) have to be used.

It is an additional advantage of the claimed material that due to the significant lower glass transition temperature of SBR (approx. −50° C.) compared to e.g. NBR (approx. −22° C.) the material can be used for low temperature insulation without the risk of cracks or any other damages.

EXAMPLES

In the following examples and comparative examples the base compounds were mixed in a closed mixer (average mixing time 8 minutes, average dumping temperature 120° C.), then mixed on a roller mill to obtain accelerated sulphur curing with azodicarbonamide as expansion agent as it is standard in the industry, then extruded and expanded to a 25 mm thick foam sheet. Table 1 lists the used raw materials; Table 2 shows the respective compounds.

TABLE 1

Raw materials

| Chemical | Trade name | Supplier |
|---|---|---|
| Polystyrene Butadiene Rubber (SBR) | Krylene ® 1502 | Lanxess, Germany |
| Polyvinylchloride (PVC) | Vinnolit © S3265 | Vinnolit, Germany |
| Chlorinated Polyethylene (CPE) | Elaslen ® 401AY | Showa Denko, Japan |
| Polybutadiene (BR) | Buna ® CB23 | Lanxess, Germany |
| Ethylene Vinyl Acetate (EVA) | Levapren ® 400 | Lanxess, Germany |
| Aluminium Trihydroxide (ATH) | Martinal ® 111 LE | Martinswerk, Germany |
| Carbon Black (CB) | Corax ® N550 | Evonik Industries, Germany |
| Ground Slate | F 170 | Schieferwerk Bacharach, Germany |
| Perlite | Rohperlite | AG Stein Germany |
| Calciumcarbonate (Chalk) | Omya ® BSH | Omya, Germany |
| Chloroparaffin (CP) | Chlorparaffin 50 | Leuna, Germany |
| Antimony Trioxide (Sb) | Antimontrioxid | GMS-Chemie, Germany |
| Diphenyl Kresylphosphate (DPK) | Disflamoll ® DPK | Lanxess, Germany |
| Dekabromo Diphenylether (Deka) | Saytex ® 102 E | Albemarle, France |
| Zinc Borate (ZB) | ZB 467 | Great Lakes, U.S.A. |

Table 2 shows the composition of some innovative examples.

TABLE 2

SBR/PVC compounds (all innovative examples)

| No. | Composition (in phr = parts per hundred rubber/SBR) |
|---|---|
| 6 | 90 SBR, 10 BR, 80 PVC, 70 CP, 200 ATH, 120 Deka, 30 Sb, 5 DPK, 2 CB |

TABLE 2-continued

SBR/PVC compounds (all innovative examples)

| No. | Composition (in phr = parts per hundred rubber/SBR) |
|---|---|
| 7 | 100 SBR, 100 PVC, 150 CP, 300 ATH, 70 Chalk, 2 CB |
| 8 | 100 SBR, 100 CPE, 200 CP, 300 ATH, 3 ZB, 1 CB |
| 9 | 100 SBR, 100 CPE, 200 CP, 200 Ground Slate, 1 CB |
| 10 | 100 SBR, 100 CPE, 200 CP, 250 Perlite, 1 CB |

For comparison with existing insulation materials the required foams were acquired on the market (e.g. Armaflex®, Armacell GmbH, Germany; Kaiflex® KK, Kaimann, Germany) or being produced according to state of the art procedures to 25 mm thickness sheet samples.

TABLE 3

Materials and their compositions

| No. | Material | Rubber polymer | PVC/CPE | Flame retardant** | Miscellaneous |
|---|---|---|---|---|---|
| 1 | AF/Armaflex ® | NBR | PVC | Brominated/antimony | ATH filled |
| 2 | NH/Armaflex ® | NBR | — | halogen free | ATH filled |
| 3 | HT/Armaflex ® | EPDM | — | Brominated/antimony | ATH filled |
| 4 | Kaiflex ® KK | NBR | PVC | Brominated/antimony | ATH filled |
| 5 | Kaiflex ® BluEco | NBR | — | halogen free | ATH filled |
| 6* | | SBR | PVC | Brominated/antimony | ATH filled |
| 7* | | SBR | PVC | Chloroparaffin | ATH filled |
| 8* | | SBR | CPE | Chloroparaffin | ATH filled |
| 9* | | SBR | CPE | Chloroparaffin | Slate filled |
| 10* | | SBR | CPE | Chloroparaffin | Perlite filled |

(*= innovative example)
**brominated/antimony is chemically equivalent to Deka/Sb, see Table 1.

The materials were partially examined for fire retardant behaviour according to EN 13823/EN 13501-1 (single burning item/round corner test) and DIN 4102-1. Table 4 shows the results.

TABLE 4

Flammability test results

| Material | EN 13823/13501-1 | DIN 4102-1 |
|---|---|---|
| 1 | B s3 d0 | B1 |
| 2 | E/D s3 d0 | —/B2 |
| 3 | D/C s3 d0 | B2/B1 |
| 4 | C s3 d0 | B1 |
| 5 | E | — |
| 6* | B s3 d0 | B1 |
| 7* | B s3 d0 | B1 |
| 8* | B s3 d0/B s2 d0 | B1 |
| 9* | B s3 d0 | B1 |
| 10* | B s3 d0/B s2 d0 | B1 |

(*= innovative example)

Table 5 shows the insulation properties of the claimed material vs. other FEF types.

TABLE 5

Insulation properties

| Material | Density [kg/m³] | λ [W/m*K] at 0° C. according to EN 12667 | Water Vapour Barrier (WVT) μ according to EN 12086 |
|---|---|---|---|
| 1 | 56 | 0.033 | 10000 |
| 2 | 61 | 0.035 | 7500 |
| 3 | 65 | 0.036 | 6500 |
| 4 | 59 | 0.034 | 10000 |
| 5 | 66 | 0.037 | 6000 |
| 6* | 51 | 0.034 | 10000 |
| 7* | 48 | 0.033 | 10000 |
| 8* | 47 | 0.034 | 10000 |
| 9* | 45 | 0.033 | 9500 |
| 10* | 45 | 0.033 | 8000 |

(*= innovative example)

The invention claimed is:

1. A material comprising at least one layer (A) of expanded elastomer or thermoplastic elastomer blend and one or more additional layers (B) applied on one or more multiples sides of layer (A);
wherein layer (A) comprises a styrene substituted organic polymer, which is present in the formulation in at least 30 phr—related to a total elastomeric polymer content of 100 parts per hundred rubber (phr)—
and layer (A) furthermore comprises at least 10 phr of a chlorinated organic polymer of thermoplastic or thermoplastic elastomer nature—related to the styrene substituted organic polymer—
and layer (A) additionally comprises greater than 60 phr of halogenated paraffin, halogenated fatty acid substituted glycerine, or any combination thereof,
and wherein layer (A) comprises at least 200 phr of fine powdered inorganic filler selected from the group consisting of aluminum trihydroxide, perlite, vermiculite, slate, clay, carbon black, graphite, silicate, quartz, and combinations thereof, and wherein the styrene substituted organic polymer and the chlorinated organic polymer form a stable mechanically miscible composition, and wherein layer (A) is expanded to form a tubular shape by extrusion such that layer (A) forms a tube, and the tube comprises a longitudinal seam extending along a length thereof;

wherein layer (B) is applied to layer (A) to provide one or more overlaps such that the one or more overlaps of layer (B) are applied to the longitudinal seam of the tube of layer (A) to seal the longitudinal seam.

2. The material according to claim 1 wherein the styrene substituted organic polymer shows a styrene content of at least 10 (bound styrene according to ASTM D5775).

3. The material according to claim 2, wherein the styrene substituted organic polymer shows a styrene content of at least 17%.

4. The material according to claim 2, wherein the styrene substituted organic polymer shows a styrene content of at least 20%.

5. The materials according to claim 1 wherein the styrene substituted organic polymer is present in the formulation to 100 phr.

6. The material according to claim 1 wherein the halogenated paraffin is chloroparaffin wherein the degree of chlorination is at least 15 percent.

7. The material according to claim 6, wherein the chloroparaffin is long-chain chlorinated paraffin (C>17).

8. The material according to claim 6, wherein the degree of chlorination is at least 20 percent.

9. The material according to claim 6, wherein the degree of chlorination is at least 30 percent.

10. The material according to claim 1 wherein the halogenated fatty acid substituted glycerine is chlorinated fatty acid substituted glycerine wherein the degree of chlorination is at least 15 percent.

11. The material according to claim 10, wherein the chlorinated fatty acid substituted glycerine is chlorinated fatty acid glycerine with at least C>8.

12. The material according to claim 10, wherein the degree of chlorination is at least 20 percent.

13. The material according to claim 10, wherein the degree of chlorination is at least 30 percent.

14. The material according to claim 1 wherein the elastomeric or thermoplastic elastomer blend foam has a closed cell content of at least 80% and a density of less than 100 kg/m$^3$ according to ISO 845.

15. The material according to claim 14 wherein the expanded elastomeric or thermoplastic elastomer blend is showing a thermal conductivity of less than 0.075 W/mK at 0° C. according to EN 12667.

16. The material according to claim 14 wherein the expanded elastomeric or thermoplastic elastomer blend is showing a water vapour diffusion barrier property of at least µ 1800 according to EN 12086.

17. The material according to claim 14 wherein surface structures are applied on the inner and/or the outer side of at least one of the layers.

18. The material according to claim 17, wherein surface structures are applied on the inner side of (A).

19. The material according to claim 14, wherein the elastomeric or thermoplastic elastomer blend foam has a density of less than 65 kg/m3 according to ISO 845.

20. The material according to claim 14, wherein the elastomeric or thermoplastic elastomer blend foam has a density of less than 50 kg/m3 according to ISO 845.

21. The material according to claim 15, wherein the expanded elastomeric or thermoplastic elastomer blend is showing a thermal conductivity of less than 0.040 W/mK at 0° C. according to EN 12667.

22. The material according to claim 15, wherein the expanded elastomeric or thermoplastic elastomer blend is showing a thermal conductivity of less than 0.035 W/mK at 0° C. according to EN 12667.

23. The material according to claim 16, wherein the expanded elastomeric or thermoplastic elastomer blend is showing a water vapour diffusion barrier property of at least µ 2500 according to EN 12086.

24. The material according to claim 16, wherein the expanded elastomeric or thermoplastic elastomer blend is showing a water vapour diffusion barrier property of at least µ 5000 according to EN 12086.

25. The material according to claim 1 wherein the one or more overlaps are sealed by adhesive and/or application of heat and/or UV to obtain a tight sealing of the longitudinal seam.

26. The material according to claim 1 wherein additional layers (C) are applied between the inner (A) and outer layer (B) and/or on top of the outer layer (B).

27. The material according to claim 1 wherein the layers are bond with an adhesive which is flame retardant, adhered by themselves, bond by melting, bond by UHF welding, or any mixture of said methods.

28. The material according to claim 1, wherein the styrene substituted organic polymer is styrene butadiene elastomer.

29. The material according to claim 1, wherein the styrene substituted organic polymer is present in the formation in at least 50 phr.

30. The material according to claim 1, wherein the styrene substituted organic polymer is present in the formation in at least 70 phr.

31. The material according to claim 1, wherein the layer (A) comprises at least 30 phr of chlorinated organic polymer of thermoplastic or thermoplastic elastomer nature.

32. The material according to claim 1, wherein the layer (A) comprises at least 50 phr of chlorinated organic polymer of thermoplastic or thermoplastic elastomer nature.

33. The material according to claim 1, wherein the chlorinated organic polymer of thermoplastic or thermoplastic elastomer nature is polyvinyl chloride (PVC) and/or chlorinated polyethylene (CPE, CM).

34. The material according to claim 1, wherein the layer (A) comprises at least 70 phr of halogenated paraffin, halogenated fatty acid substituted glycerine, or any combination thereof.

35. A process for manufacturing the material according to claim 1 in a continuous process.

36. The process according to claim 35 wherein the material is brought to a lower than the ambient manufacturing temperature, down to less than 10° C., then cut and laminated with (B) or alternatively laminated with (B) and then cut.

37. A process for manufacturing the claimed material according to claim 1 wherein the material (A) is expanded and given shape to a tube or sheet, by extrusion and/or calendaring.

* * * * *